US012567430B2

(12) United States Patent
Schindler et al.

(10) Patent No.: US 12,567,430 B2
(45) Date of Patent: Mar. 3, 2026

(54) METHOD AND DEVICE FOR IMPROVING DIALOGUE INTELLIGIBILITY DURING PLAYBACK OF AUDIO DATA

(71) Applicant: Dolby International AB, Dublin (IE)

(72) Inventors: Christian Schindler, Nuremberg (DE); Malte Schmidt, Feucht (DE)

(73) Assignee: Dolby International AB, Dublin (IE)

( * ) Notice: Subject to any disclaimer, the term of this patent is extended or adjusted under 35 U.S.C. 154(b) by 368 days.

(21) Appl. No.: 17/925,261

(22) PCT Filed: May 12, 2021

(86) PCT No.: PCT/EP2021/062619
§ 371 (c)(1),
(2) Date: Nov. 14, 2022

(87) PCT Pub. No.: WO2021/228935
PCT Pub. Date: Nov. 18, 2021

(65) Prior Publication Data
US 2023/0238016 A1     Jul. 27, 2023

Related U.S. Application Data

(60) Provisional application No. 63/025,479, filed on May 15, 2020.

(30) Foreign Application Priority Data

May 15, 2020     (EP) ..................................... 20174974

(51) Int. Cl.
*G10L 21/0364*     (2013.01)
*G11B 27/031*      (2006.01)
*H04N 21/439*      (2011.01)

(52) U.S. Cl.
CPC ........ *G10L 21/0364* (2013.01); *G11B 27/031* (2013.01); *H04N 21/439* (2013.01)

(58) Field of Classification Search
CPC . G10L 21/0364; G10L 19/008; G11B 27/031; H04N 21/439; H04N 21/4318; H04R 2430/01; H04R 3/005; G06F 3/165
See application file for complete search history.

(56) References Cited

U.S. PATENT DOCUMENTS

| | | | |
|---|---|---|---|
| 9,615,170 B2 | 4/2017 | Kirsch | |
| 2003/0125933 A1* | 7/2003 | Saunders | ......... G11B 20/00007 704/201 |

(Continued)

FOREIGN PATENT DOCUMENTS

| | | |
|---|---|---|
| CN | 1949795 A | 4/2007 |
| CN | 101518098 A | 8/2009 |

(Continued)

OTHER PUBLICATIONS

Li Shengfei, Research on Digital Audio Processing Technology Based on FPGA+DSP Architecture, Microcontrollers & Embedded Systems, Jan. 1, 2018, 5 pages.

(Continued)

*Primary Examiner* — Bhavesh M Mehta
*Assistant Examiner* — Jangwoen Lee

(57)     ABSTRACT

Described herein is a method for improving dialogue intelligibility during playback of audio data on a playback device, wherein the audio data comprise dialogue audio data, and at least one of music and effects audio data, the method including the steps of: determining a volume mixing ratio based on a volume value for playback; mixing the dialogue audio data and the at least one of music and effects audio data based on said volume mixing ratio; and outputting the mixed audio data for playback. Described are further (Continued)

a respective playback device and a respective computer program product.

18 Claims, 5 Drawing Sheets

(56) References Cited

U.S. PATENT DOCUMENTS

| | | | |
|---|---|---|---|
| 2004/0213420 A1 | 10/2004 | Gundry | |
| 2009/0245539 A1 | 10/2009 | Vaudrey | |
| 2015/0237454 A1 | 8/2015 | Scheirer | |
| 2016/0078879 A1 | 3/2016 | Lu | |
| 2016/0315722 A1* | 10/2016 | Holman | G11B 27/031 |
| 2019/0014435 A1* | 1/2019 | Baijal | H03G 3/3005 |
| 2020/0058317 A1* | 2/2020 | Gaalaas | G10L 21/0364 |

FOREIGN PATENT DOCUMENTS

| | | |
|---|---|---|
| CN | 103915103 A | 7/2014 |
| CN | 108337606 A | 7/2018 |
| CN | 108432130 A | 8/2018 |
| JP | 2012034295 A | 2/2012 |
| WO | 2008032209 A2 | 3/2008 |

OTHER PUBLICATIONS

Ma Lin and Fu Rong, Common Problems in Broadcast Audio Mixing and How to Correct Them, Guangxi People's Broadcasting Station, Music Magazine, 181-182, 2 pages.

* cited by examiner

METHOD AND DEVICE FOR IMPROVING DIALOGUE INTELLIGIBILITY DURING PLAYBACK OF AUDIO DATA

CROSS-REFERENCE TO RELATED APPLICATIONS

This application claims priority of the following priority applications: U.S. provisional application 63/025,479, filed 15 May 2020 and EP application 20174974.4, filed 15 May 2020, which are hereby incorporated by reference.

TECHNOLOGY

The present disclosure relates generally to a method for improving dialogue intelligibility during playback of audio data on a playback device, and more specifically to mixing of audio data including dialogue audio data and at least one of music and effects audio data based on a volume mixing ratio which is determined based on a volume value for playback. The present disclosure relates further to a playback device having implemented a media playback system for improving dialogue intelligibility during playback of audio data and a respective computer program product.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Media content such as movies, series, sports broadcast, entertainment shows, news or else is usually composed of video data and associated audio data. Depending on a type of the media content, these audio data may include dialogue audio data as well as music and/or effects audio data. These audio data are usually distributed in the form of a sound pre-mix. At present, it is, however, not possible to change this sound pre-mix at the consumer side which may lead to poor sound reproduction. For example, if in case of a movie the sound pre-mix had been generated in consideration of a cinematic environment rather than a private environment, dialogue tracks may be perceived as comparably unbalanced in view of overly loud music and effects tracks.

In view of the above, there is thus an existing need for methods and devices that allow for a flexible and individual adjustment of the playback volume of a dialogue audio track in relation to music and effects audio tracks. In particular, it would be desirable to be able to automatically adjust the gain of the dialogue audio track independent of the music and effects audio tracks.

SUMMARY

In accordance with a first aspect of the present disclosure there is provided a method for improving dialogue intelligibility during playback of audio data on a playback device, wherein the audio data may comprise dialogue audio data, and at least one of music and effects audio data. The method may include the step of (a) determining a volume mixing ratio as a function of a sound pressure level based on a volume value for playback by mapping the volume value for playback to the sound pressure level, wherein the volume mixing ratio refers to a ratio of the volume of the dialogue audio data over the volume of the at least one of music and effects audio data. The method may further include the step of (b) mixing the dialogue audio data and the at least one of music and effects audio data based on said volume mixing ratio. And the method may include the step of (c) outputting the mixed audio data for playback.

Configured as above, the method described allows for automatic adjustment of the playback volume of a dialogue track in media content based on a current playback volume of the device that plays the media content. In this context, a volume mixing ratio of dialogue audio data to music and effects audio data may decrease with increasing (absolute) playback volume.

In some embodiments, in step (b) mixing the dialogue audio data, and the at least one of music and effects audio data based on said volume mixing ratio may include applying a gain at least to the dialogue audio data.

In some embodiments, in step (a) the volume value for playback may be mapped to a sound pressure level and the volume mixing ratio may be determined as a function of said sound pressure level. A relationship between the volume mixing ratio and the sound pressure level (SPL) may be linear, wherein the volume mixing ratio may decrease linearly with increasing sound pressure level.

In some embodiments, in step (a) the volume value for playback may be based on a volume value setting of the playback device. This configuration allows for a flexible and individual adjustment of dialogue intelligibility depending on the absolute playback volume.

In some embodiments, the volume value setting may be a user-defined value. This configuration allows for an adjustment of the dialogue intelligibility in relation to a user's preferred current absolute playback volume.

In some embodiments, in step (a) the volume mixing ratio may further be determined based on an ambient sound pressure level. This configuration allows to further consider individual environmental conditions the playback device is placed in, for example, noisy background or effects resulting from obstacles in a room or the overall design of the room (environmental awareness/room compensation).

In some embodiments, the ambient sound pressure level may be determined based on a measurement by one or more microphones.

In some embodiments, prior to step (a), the method may further include:

(i) receiving a bitstream including compressed audio data; and (ii) core decoding, by a core decoder, the compressed audio data and providing the dialogue audio data, and the at least one of music and effects audio data.

In some embodiments, in step (i) the received bitstream may further include information on an audio content type, and in step (a) the volume mixing ratio may further be determined based on said audio content type. This configuration enables to further adjust dialogue intelligibility by considering that sound mixes may differ for varying content types. For example, in case of a movie, the dialogue track may be less pronounced than for a sport broadcast or news program. Advantageously, the audio content type may be signaled via metadata included in the bitstream received by the playback device.

In some embodiments, the audio content type may include one or more of audio content of a movie, audio content of a news program, audio content of a sports broadcast, and episodical audio content.

In some embodiments, the method may further include analyzing the compressed audio data to provide the dialogue audio data, and the at least one of music and effects audio data. In this configuration, analyzing may not only include differentiation between dialogue, music and effects audio data, but may also include the determination of a content type as referred to above.

In accordance with a second aspect of the present disclosure there is provided a playback device having implemented a media playback system for improving dialogue intelligibility during playback of audio data comprising dialogue audio data, and at least one of music and effects audio data. The media playback system may include (a) an audio processor for determining a volume mixing ratio as a function of a sound pressure level based on a volume value for playback by mapping the volume value for playback to the sound pressure level, wherein the volume mixing ratio refers to a ratio of the volume of the dialogue audio data over the volume of the at least one of music and effects audio data. The media playback system may further include (b) a mixer for mixing the dialogue audio data and the at least one of music and effects audio data based on said volume mixing ratio. And the media playback system may include (c) a controller for outputting the mixed audio data for playback.

In some embodiments, the mixer may further be configured to apply a gain at least to the dialogue audio data.

In some embodiments, the audio processor may be configured to map the volume value for playback to a sound pressure level for determining the volume mixing ratio as a function of said sound pressure level.

In some embodiments, the playback device may further include a user interface for receiving a volume value setting of a user, and the volume value for playback may be based on said volume value setting.

In some embodiments, the playback device may further include one or more microphones for determining an ambient sound pressure level, and the audio processor may be configured to determine the volume mixing ratio further based on said ambient sound pressure level.

In some embodiments, the playback device may further include (i) a receiver for receiving a bitstream including compressed audio data. And the playback device may further include (ii) a core decoder for core decoding the compressed audio data and for providing the dialogue audio data, and the at least one of music and effects audio data.

In some embodiments, the core decoder may further be configured to analyze the compressed audio data to provide the dialogue audio data, and the at least one of music and effects audio data.

In accordance with a third aspect of the present disclosure there is provided a computer program product with instructions adapted to cause a device having processing capability to carry out a method for improving dialogue intelligibility during playback of audio data on a playback device.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Dialogue Intelligibility During Playback of Audio Data

During playback of audio data on a playback device, a common problem observed is that a sound pre-mix is often insufficient for a good sound reproduction. If, for example, a movie is played back on TV, whereas the sound mix had been created for a cinematic environment, dialogue intelligibility may be insufficient due to perceived overly loud music and effects. Similarly, if, for example, a user's hearing ability is impaired, in particular, dialogue intelligibility may be affected. The design of the playback environment may also add to the insufficient perception of dialogue during playback.

Method and device as described herein enable to improve the intelligibility of dialogue audio data during playback of audio data that further comprise at least one of music and effects audio data based on a volume mixing ratio of the dialogue audio data to the music and effects audio data. In particular, the gain of the dialogue audio data can be automatically adjusted based on said volume mixing ratio. Method for Improving Dialogue Intelligibility During Playback of Audio Data Referring to the example of FIG. 1, a method for improving dialogue intelligibility during playback of audio data on a playback device is illustrated, wherein the audio data may comprise dialogue audio data, and at least one of music and effects audio data. In step S101, a volume mixing ratio is determined based on a volume value for playback.

In an embodiment, the volume value for playback may be mapped to a sound pressure level and the volume mixing ratio may be determined as a function of said sound pressure level. The volume mixing ratio may refer to a ratio of the volume of the dialogue audio data over the (sum of the) volume of the at least one of music and effects audio data.

Figure 2:
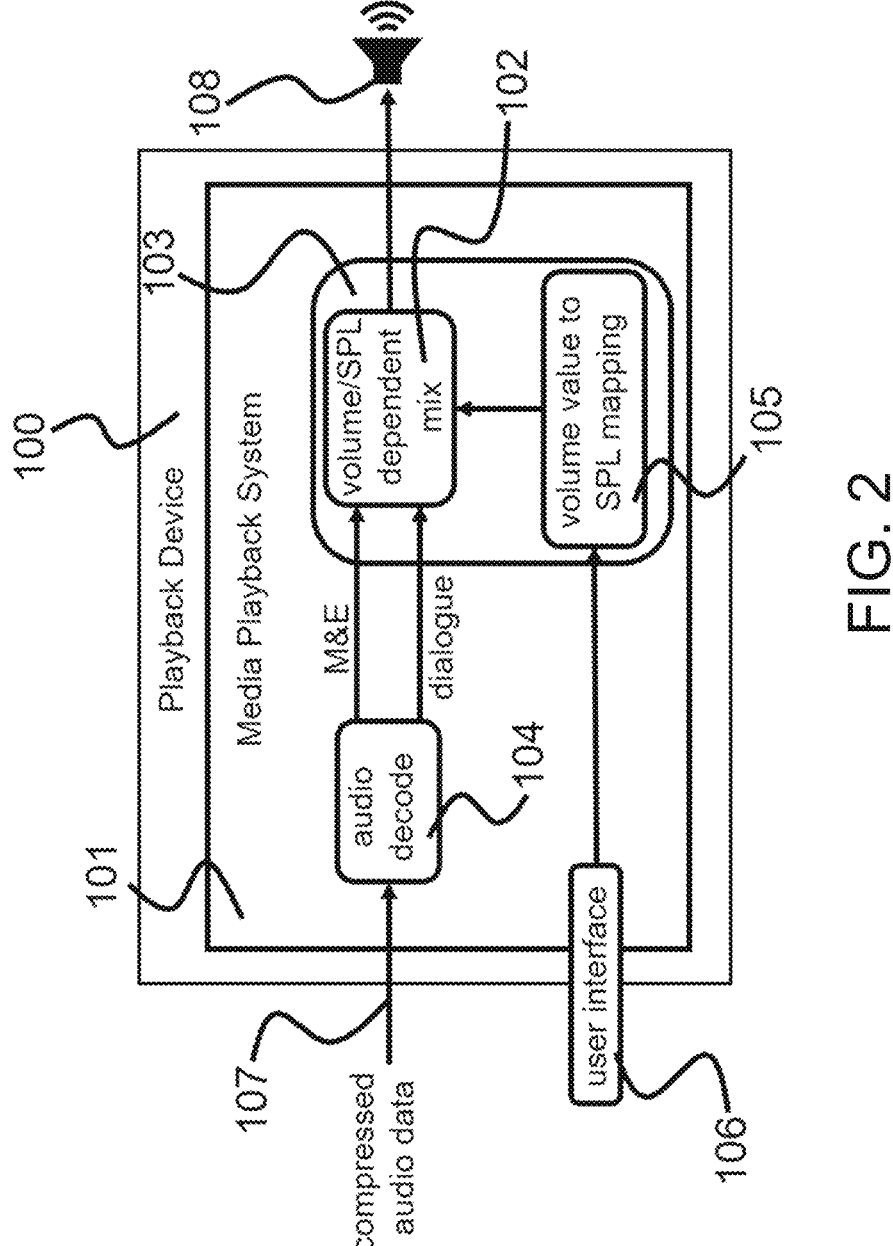
FIG. 2 illustrates an example of a playback device having implemented a media playback system for improving dialogue intelligibility during playback of audio data comprising dialogue audio data, and at least one of music and effects (M&E) audio data.
Figure 3:
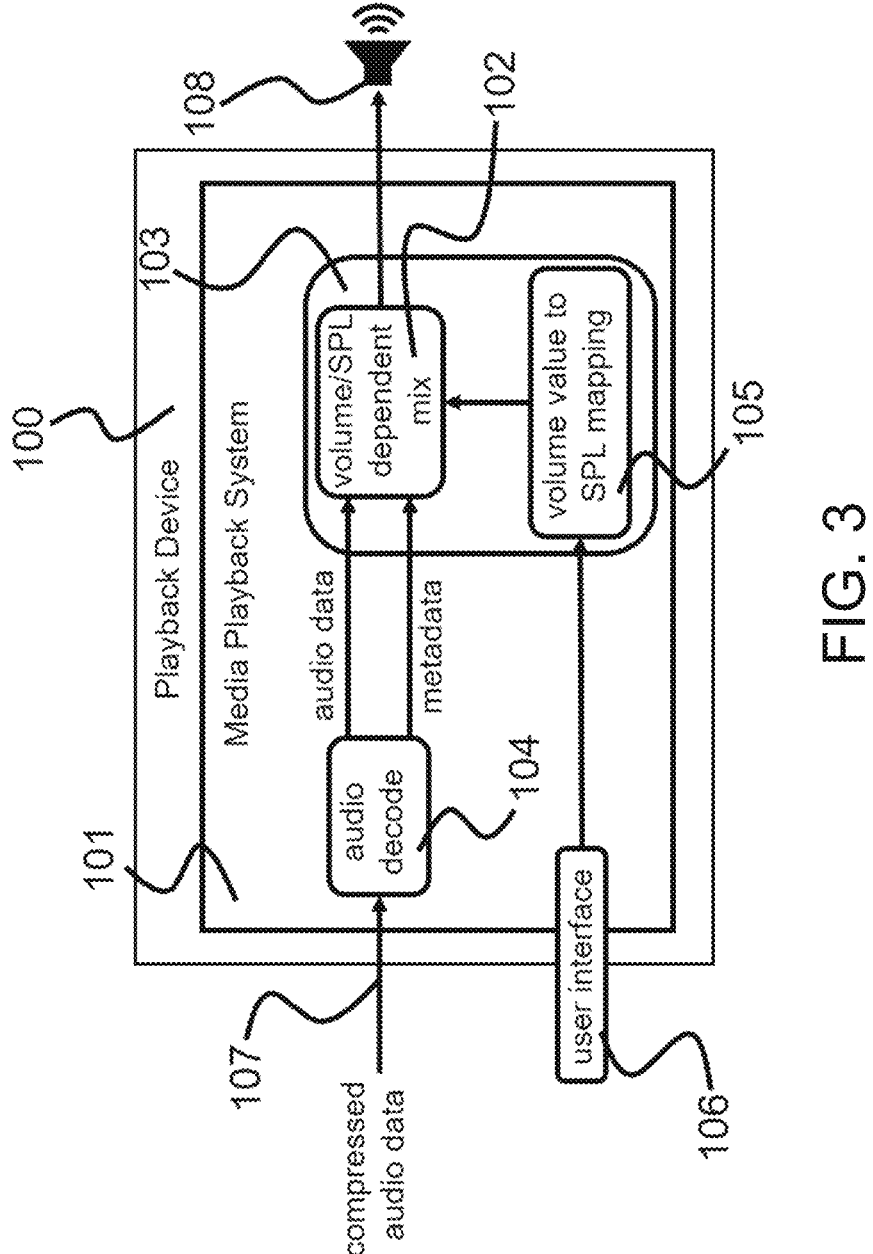
FIG. 3 illustrates a further example of a playback device having implemented a media playback system for improving dialogue intelligibility during playback of audio data comprising dialogue audio data, and at least one of music and effects (M&E) audio data.
Figure 4:
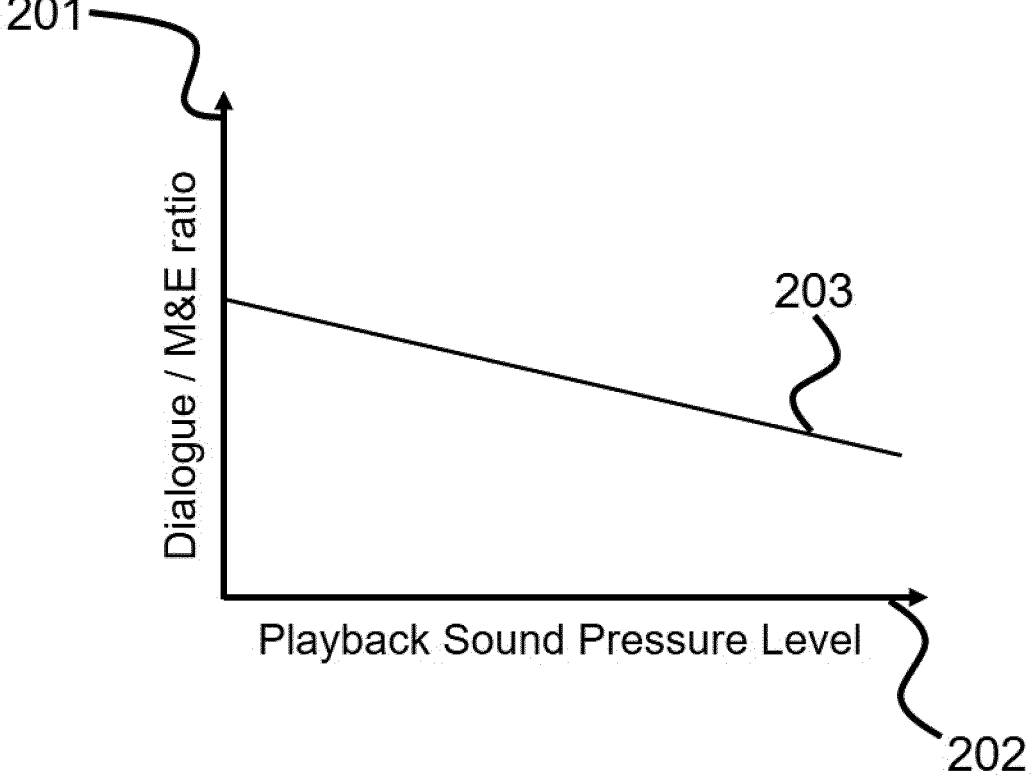
FIG. 4 illustrates an example of a correlation of a ratio of dialogue audio data to the sum of music and effects audio data with a sound pressure level.

As illustrated in the example of FIG. 4, the volume mixing ratio of dialogue audio data over music and effects audio data (M&E) 201 may follow a linear relationship 203, and may linearly decrease with increasing sound pressure level 202. This relationship may be used as a calibration curve for determining the volume mixing ratio as a function of the sound pressure level. For this purpose, the respective values of the volume mixing ratio and the sound pressure level may be stored in one or more look-up tables. An audio processor of a media playback system, as illustrated in the examples of FIG. 2 or FIG. 3, may then access the one or more look-up tables for determining a respective volume mixing ratio depending on a current sound pressure level.

Further, in an embodiment, in step S101, the volume value for playback may be based on a volume value setting of the playback device. The volume mixing ratio may be determined directly based on the volume value indicated by said volume value setting. Alternatively, or additionally, the volume value indicated by said volume value setting may be mapped to the sound pressure level as described above. While the volume value setting may be a pre-determined setting, in an embodiment, the volume value setting may be a user-defined value. A user of a playback device may thus select a current volume value for playback that fits his or her needs and the volume mixing ratio may be determined based on this user defined volume value either directly and/or by mapping this value to the sound pressure level.

Alternatively, or additionally, in step S101, the volume mixing ratio may further be determined based on an ambient sound pressure level. Ambient sound pressure level may generally refer to any ambient sound in the environment of the playback device. Ambient sound may include but is not limited to any background noise and/or any conditions in the playback environment affecting the perception of the played back audio data. While the ambient sound pressure level may be determined in any conceivable way, in an embodiment, the ambient sound pressure level may be determined based on a measurement by one or more microphones. The one or more microphones may either be implemented in the playback device or may be external microphones connected to the playback device.

Prior to step S101, in an embodiment, the method may further include: (i) receiving a bitstream including compressed audio data; and (ii) core decoding, by a core decoder, the compressed audio data and providing the dialogue audio data, and the at least one of music and effects audio data. This may account for the fact that the method may be applicable to both, uncompressed or compressed audio data. In an embodiment, the compressed audio data may be analyzed to provide the dialogue audio data, and the at least one of music and effects audio data. This may allow for performing dialogue detection also at the decoder side. In order to provide the dialogue audio data, and the at least one of music and effects audio data, the dialogue audio data may further be extracted either prior to or after core decoding the compressed audio data. Alternatively, or additionally, if the compressed audio data are, for example, in a format such as AC-4, the dialogue audio data may not be extracted by the decoder, but metadata may be included in and extracted from the received bitstream. The metadata may then be used to improve the dialogue intelligibility based on the determined volume mixing ratio. In other words, the metadata may be used to boost certain frequency bands in the transmitted "complete" audio data.

In a further embodiment, in the aforementioned step (i), the received bitstream may further include information on an audio content type, wherein in step S101 the volume mixing ratio may then further be determined based on said audio content type. The audio content type may also be signaled in the bitstream via respective metadata. As, for example, dialogue may be more pronounced or distinct in news programs or sports broadcast as compared to movies, for example, the consideration of the audio content type may thus allow for the improvement of dialogue intelligibility in consideration of different sound mixes. In an embodiment, the audio content type may include one or more of audio content of a movie, audio content of a news program, audio content of a sports broadcast, and episodical audio content.

Figure 1:
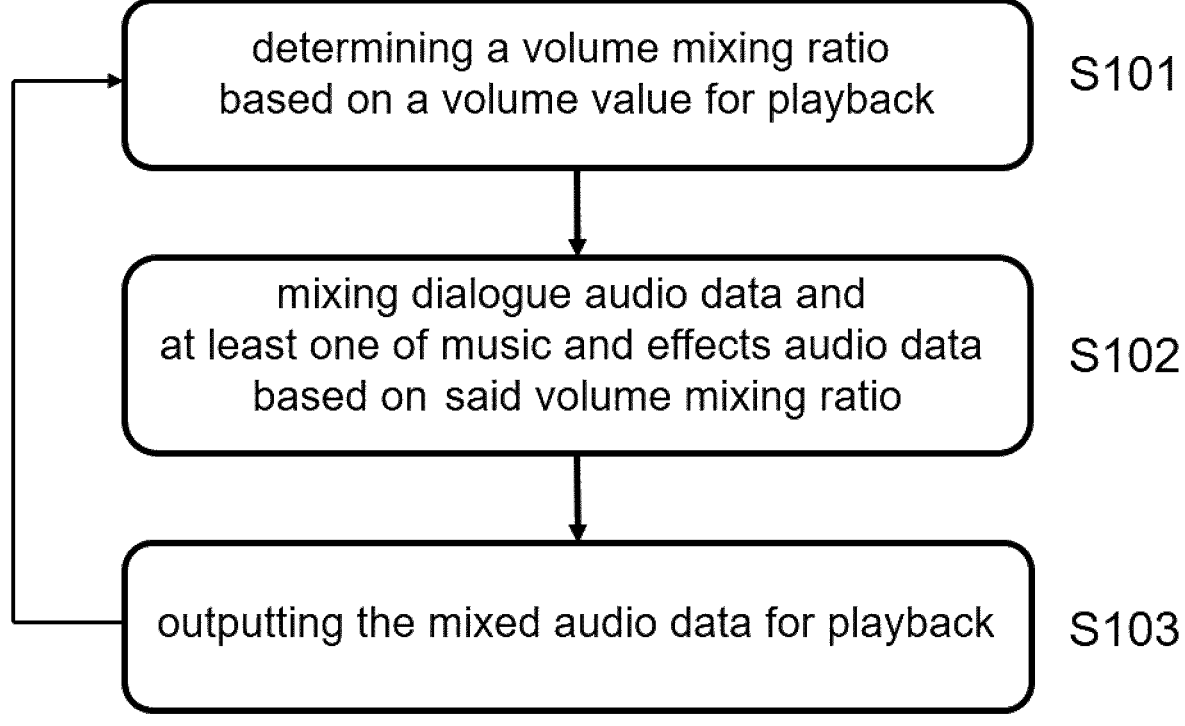
FIG. 1 illustrates an example of a method for improving dialogue intelligibility during playback of audio data on a playback device, wherein the audio data may comprise dialogue audio data, and at least one of music and effects audio data.

Referring again to the example of FIG. 1, in step S102, the dialogue audio data and the at least one of music and effects audio data are mixed based on the volume mixing ratio. In an embodiment, in step S102, mixing the dialogue audio data, and the at least one of music and effects audio data based on said volume mixing ratio may include applying a gain at least to the dialogue audio data. To further balance the volume of the dialogue audio data in relation to the volume of the at least one of music and effects audio data during playback, a respective gain may also be applied to the at least one of music and effects audio data.

In step S103, the mixed audio data are then output for playback. Playback of the audio data may be facilitated in any conceivable way and is not limited. Outputting the mixed audio data for playback may, however, also include rendering of the mixed audio data. As indicated in FIG. 1 by the arrow connecting step S103 and step S101, the sequence of steps of the method described may be repeated in order to continuously adjust the dialogue intelligibility whenever the playback volume may change.

Playback Device Having Implemented a Media Playback System

Referring to the examples of FIG. 2 and FIG. 3, a playback device 100 is illustrated having implemented a media playback system 101 for improving dialogue intelligibility during playback of audio data comprising dialogue audio data, and at least one of music and effects audio data. The media playback system 101 includes an audio processor 103 for determining a volume mixing ratio based on a volume value for playback.

In an embodiment, the audio processor 103 may be configured to map the volume value for playback to a sound pressure level (SPL) in a volume value to SPL mapping unit 105 for determining the volume mixing ratio as a function of said sound pressure level.

As illustrated in the example of FIG. 2, in an embodiment, the playback device 100 may further include a user interface 106 for receiving a volume value setting of a user. The volume value set by the user may be input into the volume value to SPL mapping unit 105 for determining the volume mixing ratio as a function of said sound pressure level. Alternatively, or additionally, the volume value to SPL mapping unit 105 may be bypassed and the volume mixing ratio may be directly determined based on the volume value set by the user.

In an embodiment, the playback device 100 may further include one or more microphones (not shown) for determining an ambient sound pressure level. In this case, the audio processor 103 may be configured to determine the volume mixing ratio further based on said ambient sound pressure level.

Referring again to the example of FIG. 2, the media playback system 101 further includes a mixer 102 for mixing the dialogue audio data and the at least one of music and effects audio data based on the determined volume mixing ratio as described above.

In an embodiment, the mixer 102 may further be configured to apply a gain at least to the dialogue audio data.

The media playback system 101 further includes also a controller for outputting the mixed audio data for playback 108. For example, in case of a 3.0 channel mix, a center channel may include dialogue, only. In this case, only the center channel volume may be varied as a result of the final sound mix output by the mixer 102.

In an embodiment, the playback device 100 may further include a receiver for receiving a bitstream including compressed audio data 107. The media playback system 101 may then include a core decoder 104 for core decoding the compressed audio data and for providing the dialogue audio data, and the at least one of music and effects audio data. Referring to the example of FIG. 2, in an embodiment, the core decoder 104 may further be configured to analyze the compressed audio data to provide the dialogue audio data, and the at least one of music and effects audio data. This may allow for performing dialogue detection also at the decoder side. In order to provide the dialogue audio data, and the at least one of music and effects audio data, the core decoder 104 may further be configured to extract the dialogue audio data either prior to or after core decoding the compressed audio data. Referring now to the example of FIG. 3, alternatively, or additionally, if the compressed audio data are, for example, in a format such as AC-4, the dialogue audio data may not be extracted by the core decoder 104, but metadata may be included in the received bitstream and the core decoder 104 may be configured to extract the metadata from the received bitstream in addition to core decoding the compressed audio data. The mixer 102 may then be configured to use the metadata to improve the dialogue intelligibility based on the determined volume mixing ratio. In other words, the mixer 102 may be configured to use the metadata to boost certain frequency bands in the transmitted "complete" audio data. It is to be noted that while in FIG. 3 the core decoder 104 and the mixer 102 are described as being individual entities of a media playback system, the mixer 102 and the core decoder 104 may also be part of a decoder such that the method described herein may be performed by a decoder implemented in a respective playback device.

Figure 5:
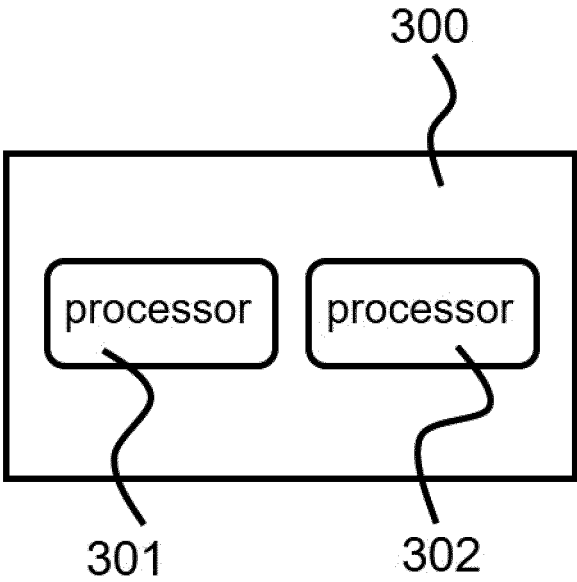
FIG. 5 illustrates an example of a device having processing capability.

While the method described herein may be performed by a playback device having implemented a media playback system as described above, it is noted that alternatively, or additionally, said method may also be implemented as a computer program product with instructions adapted to cause a device 300 having processing capability 301, 302 to carry out said method. Such a device is exemplarily illustrated in FIG. 5.

Interpretation

Unless specifically stated otherwise, as apparent from the following discussions, it is appreciated that throughout the disclosure discussions utilizing terms such as "processing," "computing," "determining", analyzing" or the like, refer to the action and/or processes of a computer or computing system, or similar electronic devices, that manipulate and/or transform data represented as physical, such as electronic, quantities into other data similarly represented as physical quantities.

In a similar manner, the term "processor" may refer to any device or portion of a device that processes electronic data to transform that electronic data into other electronic data. A "computer" or a "computing machine" or a "computing platform" may include one or more processors.

As stated above, the methods described herein may be implemented as a computer program product with instructions adapted to cause a device having processing capability to carry out said methods. Any processor capable of executing a set of instructions (sequential or otherwise) that specify actions to be taken are included. Thus, one example may be a typical processing system that may include one or more processors. Each processor may include one or more of a CPU, a graphics processing unit, tensor processing unit and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD), a light emitting diode display (LED) of any kind, for example, including OLED (organic light emitting diode) displays, or a cathode ray tube (CRT) display. If manual data entry is required, the processing system may also include an input device such as one or more of an alphanumeric input unit such as a keyboard, a pointing control device such as a mouse, and so forth. The processing system may also encompass a storage system such as a disk drive unit. The processing system may include a sound output device, for example one or more loudspeakers or earphone ports, and a network interface device.

A computer program product may, for example, be software. Software may be implemented in various ways. Software may be transmitted or received over a network via a network interface device or may be distributed via a carrier medium. A carrier medium may include but is not limited to, non-volatile media, volatile media, and transmission media. Non-volatile media may include, for example, optical, magnetic disks, and magneto-optical disks. Volatile media may include dynamic memory, such as main memory. Transmission media may include coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

Note that when the method to be carried out includes several elements, e.g., several steps, no ordering of such elements is implied, unless specifically stated otherwise.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an embodiment" means that a particular feature described in connection with the embodiment is included in at least one embodiment of the present disclosure. Thus, appearances of the phrases "in one embodiment", "in some embodiments" or "in an embodiment" in various places throughout this disclosure are not necessarily all referring to the same embodiment. Furthermore, the particular features may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, device structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, steps may be added or deleted to methods described within the scope of the present disclosure.

Various aspects of the present invention may be appreciated from the following enumerated example embodiments (EEEs):

EEE1. A method for improving dialogue intelligibility during playback of audio data on a playback device, wherein the audio data comprise dialogue audio data, and at least one of music and effects audio data, the method including the steps of:
(a) determining a volume mixing ratio based on a volume value for playback;
(b) mixing the dialogue audio data and the at least one of music and effects audio data based on said volume mixing ratio; and
(c) outputting the mixed audio data for playback.

EEE2. Method according to EEE 1, wherein in step (b) mixing the dialogue audio data, and the at least one of music and effects audio data based on said volume mixing ratio includes applying a gain at least to the dialogue audio data.

EEE3. Method according to EEE 1 or 2, wherein in step (a) the volume value for playback is mapped to a sound pressure level and the volume mixing ratio is determined as a function of said sound pressure level.

EEE4. Method according to any of EEEs 1 to 3, wherein in step (a) the volume value for playback is based on a volume value setting of the playback device; and optionally
wherein the volume value setting is a user-defined value.

EEE5. Method according to any of EEEs 1 to 4, wherein in step (a) the volume mixing ratio is further determined based on an ambient sound pressure level; and optionally
wherein the ambient sound pressure level is determined based on a measurement by one or more microphones.

EEE6. Method according to any of EEEs 1 to 5, wherein, prior to step (a), the method further includes:
(i) receiving a bitstream including compressed audio data; and
(ii) core decoding, by a core decoder, the compressed audio data and providing the dialogue audio data, and the at least one of music and effects audio data.

EEE7. Method according to EEE 6, wherein in step (i) the received bitstream further includes information on an audio content type, and wherein in step (a) the volume mixing ratio is further determined based on said audio content type; and optionally
wherein the audio content type includes one or more of audio content of a movie, audio content of a news program, audio content of a sports broadcast, and episodical audio content.

EEE8. Method according to EEE 6 or 7, wherein the method further includes analyzing the compressed audio data to provide the dialogue audio data, and the at least one of music and effects audio data.

EEE9. A playback device having implemented a media playback system for improving dialogue intelligibility during playback of audio data comprising dialogue audio data, and at least one of music and effects audio data, the media playback system including:
(a) an audio processor for determining a volume mixing ratio based on a volume value for playback;
(b) a mixer for mixing the dialogue audio data and the at least one of music and effects audio data based on said volume mixing ratio; and
(c) a controller for outputting the mixed audio data for playback.

EEE10. Playback device according to EEE 9, wherein the mixer is further configured to apply a gain at least to the dialogue audio data; and/or wherein the audio processor is configured to map the volume value for playback to a sound pressure level for determining the volume mixing ratio as a function of said sound pressure level.

EEE11. Playback device according to EEE 9 or 10, wherein the playback device further includes a user interface for receiving a volume value setting of a user, and wherein the volume value for playback is based on said volume value setting.

EEE12. Playback device according to any of EEEs 9 to 11, wherein the playback device further includes one or more microphones for determining an ambient sound pressure level, and wherein the audio processor is configured to determine the volume mixing ratio further based on said ambient sound pressure level.

EEE13. Playback device according to any of EEEs 9 to 12, wherein the playback device further includes
(i) a receiver for receiving a bitstream including compressed audio data; and
(ii) a core decoder for core decoding the compressed audio data and for providing the dialogue audio data, and the at least one of music and effects audio data.

EEE14. Playback device according to EEE 13, wherein the core decoder is further configured to analyze the compressed audio data to provide the dialogue audio data, and the at least one of music and effects audio data.

EEE15. Computer program product with instructions adapted to cause a device having processing capability to carry out the method according to any of EEEs 1 to 8.

The invention claimed is:

1. A method comprising:
   determining a volume mixing ratio as a function of a sound pressure level based on a volume value for playback on a playback device by mapping the volume value for playback to the sound pressure level, wherein the volume mixing ratio refers to a ratio of the volume of the dialogue audio data over the volume of the at least one of music and effects audio data;
   mixing the dialogue audio data and the at least one of music and effects audio data based on said volume mixing ratio; and
   outputting the mixed audio data for playback.

2. The method according to claim 1, wherein mixing the dialogue audio data, and the at least one of music and effects audio data based on said volume mixing ratio includes applying a gain at least to the dialogue audio data.

3. The method according to claim 1, wherein the volume value for playback is based on a volume value setting of the playback device.

4. The method according to claim 3, wherein the volume value setting is a user-defined value.

5. The method according to claim 1, wherein the volume mixing ratio is further determined based on an ambient sound pressure level.

6. The method according to claim 5, wherein the ambient sound pressure level is determined based on a measurement by one or more microphones.

7. The method according to claim 1, wherein, prior to determining the volume mixing ratio, the method further includes:
   receiving a bitstream including compressed audio data; and
   core decoding, by a core decoder, the compressed audio data and providing the dialogue audio data, and the at least one of music and effects audio data.

8. The method according to claim 7, wherein the received bitstream further includes information on an audio content type, and wherein the volume mixing ratio is further determined based on said audio content type.

9. The method according to claim 8, wherein the audio content type includes one or more of audio content of a movie, audio content of a news program, audio content of a sports broadcast, and episodical audio content.

10. The method according to claim 7, wherein the method further includes analyzing the compressed audio data to provide the dialogue audio data, and the at least one of music and effects audio data.

11. A media playback system, comprising including:
   an audio processor for determining a volume mixing ratio as a function of a sound pressure level based on a volume value for playback by mapping the volume value for playback to the sound pressure level, wherein the volume mixing ratio refers to a ratio of the volume of the dialogue audio data over the volume of the at least one of music and effects audio data;
   a mixer for mixing the dialogue audio data and the at least one of music and effects audio data based on said volume mixing ratio; and
   a controller for outputting the mixed audio data for playback.

12. The media playback system according to claim 11, wherein the mixer is further configured to apply a gain at least to the dialogue audio data.

13. The media playback system according to claim 11, wherein the audio processor is configured to map the volume value for playback to a sound pressure level for determining the volume mixing ratio as a function of said sound pressure level.

14. The media playback system according to claim 11, wherein the playback device further includes a user interface for receiving a volume value setting of a user, and wherein the volume value for playback is based on said volume value setting.

15. The media playback system according to claim 11, wherein the playback device further includes one or more microphones for determining an ambient sound pressure level, and wherein the audio processor is configured to determine the volume mixing ratio further based on said ambient sound pressure level.

16. The media playback system according to claim 11, wherein the playback device further includes:
   a receiver for receiving a bitstream including compressed audio data; and
   a core decoder for core decoding the compressed audio data and for providing the dialogue audio data, and the at least one of music and effects audio data.

17. The media playback system according to claim 16, wherein the core decoder is further configured to analyze the compressed audio data to provide the dialogue audio data, and the at least one of music and effects audio data.

18. A non-transitory, computer-readable medium storing instructions adapted to cause a device having processing capability to carry out the method according to claim 1.

* * * * *